Oct. 7, 1924. 1,510,688
A. LA FON
POWER PLANT
Original Filed July 25, 1918
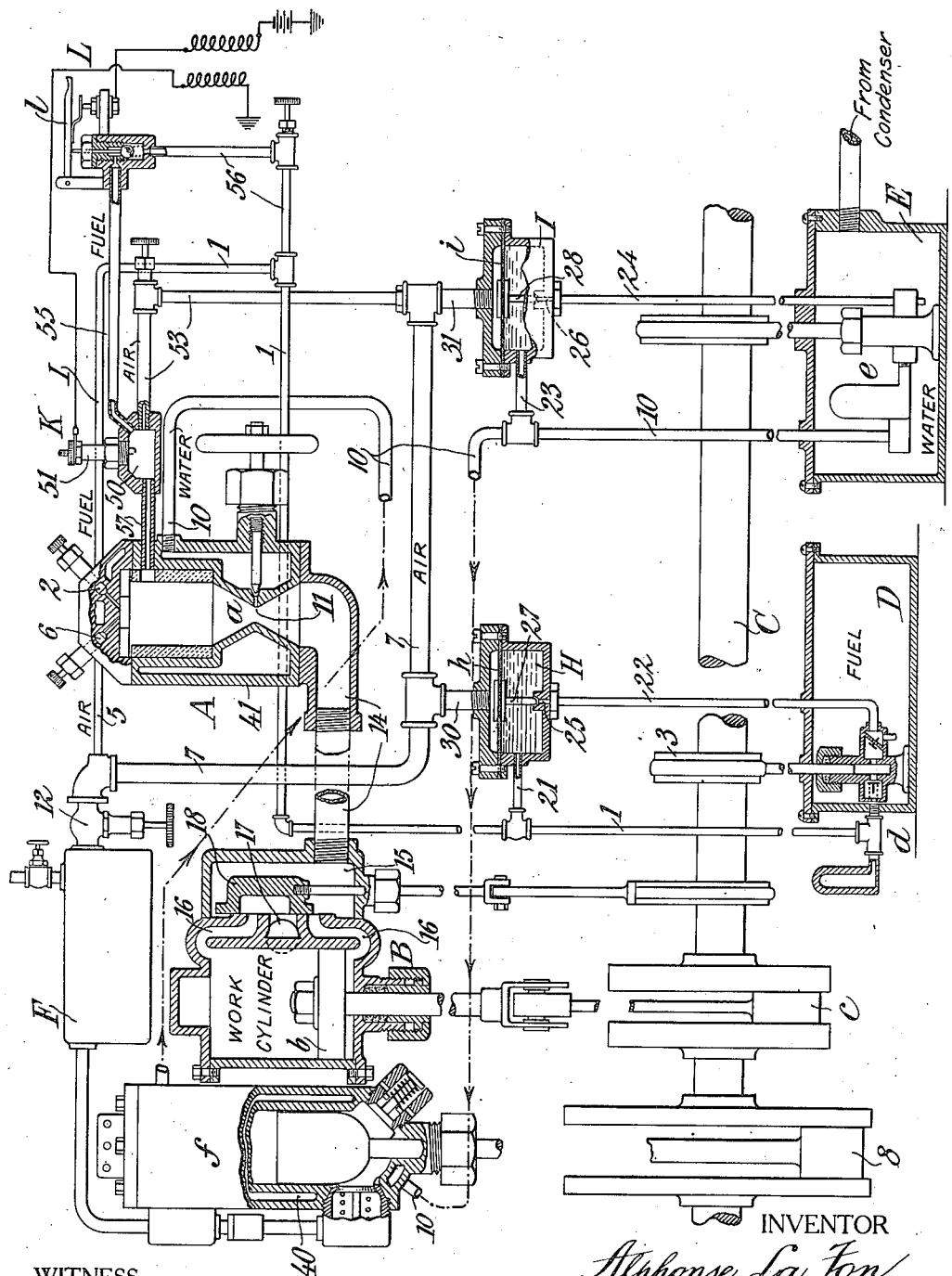
WITNESS
INVENTOR
Alphonse La Fon
By Attorneys, Patented Oct. 7, 1924.

1,510,688

UNITED STATES PATENT OFFICE.

ALPHONSE LA FON, OF SEWAREN, NEW JERSEY.

POWER PLANT.

Application filed July 25, 1918, Serial No. 246,705. Renewed March 1, 1923.

*To all whom it may concern:*

Be it known that I, ALPHONSE LA FON, a citizen of the United States of America, and a resident of Sewaren, in the county of Middlesex and State of New Jersey, have invented certain new and useful Improvements in Power Plants, of which the following is a specification.

This invention relates to power plants and processes of generating motive force, and aims to provide improvements therein.

The invention provides a process of generating motive power and a steam type of power plant wherein the weight of the plant is minimized, especially in the elimination of the boiler, and wherein the heat of the combustible (liquid hydrocarbon) is very fully utilized in converting the water which is used, into steam, and the invention hence finds especial application in driving vehicles, such as aeroplanes, or speed boats, where it is desired to have the load of the driving plant light as compared with the power developed by such plant.

The invention further provides features of improvements in connection with the satisfactory working of such a system, as an igniting device, and means for regulating and controlling the supply of liquid fuel to the combustion or generating chamber.

An embodiment of the invention is illustrated in the accompanying drawing. The figure is a somewhat diagrammatic view, and the parts are shown partially in section and partly in elevation.

In said drawing, letter A designates a combustion or generating chamber, and B designates an engine, which may be conveniently of the steam engine type, wherein the gases under pressure coming from the combustion chambers, are made to do work, as in the ordinary steam engine.

The engine B drives a shaft C through an ordinary crank connection $c$.

D designates a fuel reservoir, E a water reservoir, and F an air reservoir.

Fuel may be forced from the reservoir D to the combustion chamber A by means of a pump $d$, via pipe 1 and valve-controlled inlet 2. The pump $d$ may be conveniently driven from the shaft C by means of an eccentric 3.

Air flows from the reservoir F via the pipe 5 and valve-controlled inlet 6, the pipe 5 being tapped into an air main 7.

The air reservoir F may be replenished by a compressor $f$ conveniently driven by a crank 8 upon the shaft C.

The chamber A is formed with a venturi $a$, through which the combustion products flow, and water is forced into this venturi from the reservoir E by means of a pump $e$, pipe 10 and valve-controlled inlet 11.

In order to start the generator and engine, the air reservoir F being initially charged, the throttle 12 is opened, admitting air to the generator A via the pipe 5 and inlet 6. The compressed air flowing through the generator A, conduit 14 and chest 15, into the cylinder B, will cause the piston to move and the shaft C to turn. The shaft C will then actuate the fuel pump D and water pump E, forcing fuel through the pipe 1 and inlet 2, and water via the pipe 10 and inlet $a$. The combustible mixture in the generator A will then be ignited (preferably by a means hereinafter described), and the combustion in the chamber A will thereafter be continuous. Water entering through inlet 11 will be atomized and vaporized, and hence converted into steam. The water entering the generator A serves to largely increase the volume of the gas produced in the generator A, and also serves to considerably reduce the temperature of the combustion products formed in the generator A. The mixture of steam and combustion products flowing through the pipe 14 enter the steam chest 15 of the engine B, and are admitted alternately to either side of the piston $b$, via inlets 16, and exhausted via the exhaust conduit 17, by a slide valve 18, acting in the usual manner. The piston $b$ will thereupon be driven by the gases from the generator A (steam and combustion products), and the engine B will function as a steam engine, and will have the characteristics, as regards control, and relatively smooth working, of a steam engine. The combustion products, as stated above, will have their temperature reduced by the heat taken up by the water which is converted into steam, and hence the engine, and its lubricants, will not be burned by excessively hot gases.

H and I, respectively, designate means for controlling the flow of fuel and water to the generator A, the control being in accordance with the pressure of the air which flows to the said generator A. Each of the controllers or regulators H and I comprise a closed chamber having diaphragms $h$ and $i$, respectively, therein. The spaces below the diaphragms $h$ and $i$ are connected by return pipes 21, 22, 23, 24, respectively, to the pipe 1 and reservoir D and to pipe 10 and reservoir E.

The outlets 25, 26, leading to the pipes 22 and 24, for example, are formed with valve seats, against which are adapted to seat, at proper times, valves 27, 28, carried by the diaphragms $h$ and $i$ respectively. The space above the diaphragms $h$ and $i$ is in communication with the air line 7 through pipes 30, 31.

The action of the controllers H, I, is as follows: When the pressure of the air in the air line 7, and consequently in the pipe 5, is greater than the pressure of the fuel and water, respectively, in the pipes 1 and 10, the air above the diaphragms $h$ and $i$ flex the diaphragms in such manner as to seat the valves 27, 28, upon the seats 25, 26, and thus close the return passages to the fuel and water reservoirs, respectively. Consequently, the full supply of fuel and water is injected into the generator A, through the inlets 2 and 11, respectively.

In case the pressure of the air falls, the diaphragms $h$ and $i$ will carry the valves 25 and 26 away from the seats, so as to open the return passage to the fuel and water reservoirs, respectively. Thereupon all, or a portion of the fuel and water, respectively, pumped into the supply pipes 1 and 10, will return to the reservoirs via the return pipes 21, controller H, pipe 22, and pipe 23, controller I, and pipe 24, respectively.

The water supplied to the generator A is preferably pre-heated, the pre-heating being accomplished by conducting the water through a water jacket 40 in the air compressor, and through a water jacket 41 around the generator A. The water is thereby pre-heated, heat which would otherwise be radiated from the compressor and generator being thereby usefully employed, and, furthermore, said compressor, and the walls of the generator, are cooled, which is desirable.

K L designate an igniter for initial starting, which is preferably employed. The part K is provided with a chamber 50 for mixing air and gas, and into which chamber project the terminals of a spark plug 51. Air is supplied to the chamber 51 through a pipe 53 connected with the air main 7. Fuel is introduced into the chamber 50 through a pipe 55, valve L and pipe 56, the pipe 56 connecting with the fuel supply pipe 1. The valve L normally closes the supply of fuel through pipes 55, 56. To initially ignite the combustible mixture in the generator A, the valve L is opened, by pressing on the lever $l$, permitting some of the fuel to pass into the chamber 50. With air flowing through the pipe 53, a combustible mixture is formed, and when a spark jumps between the terminals of the spark plug, the combustible mixture is ignited, shooting a flame through the pipe 57 into the generator A, and igniting the combustible therein. The lever $l$ of the valve L is preferably adapted to close the circuit leading to the spark plug at the same time that the valve is opened to permit fuel to pass into the igniter K.

As soon as the combustible is ignited in the generator A, the lever $l$ is released, cutting off flow of fuel to the igniter K. Air, however, continues to flow through the pipe 53 and chamber 50, thereby cooling the chamber 50, and thereby preventing the device K from being excessively heated. The location of the terminals of the spark plug in an auxiliary device K prevents the terminals from being melted by the heat within the generator A.

In order to conserve water, the exhaust from the engine B may be led to any suitable condenser, and the water returned to the reservoir E.

The invention may be otherwise embodied than as herein specifically illustrated and described.

What I claim is:—

1. A power plant comprising a combustion chamber in which fluid fuel is adapted to be burned, and an igniting device, said igniting device comprising a separate combustion chamber in communication with the first, means for supplying air and fluid fuel to said igniter combustion chamber, a sparking device in said igniter chamber adapted to ignite the combustible mixture in said igniter chamber and communicate the flame to said main combustion chamber, and means for cutting off the supply of combustible fuel to said igniter chamber, the flow of air therethrough continuing, thereby maintaining a low temperature in said igniter chamber.

2. A power plant, comprising a combustion chamber of a kind in which there is a continuous combustion, comprising means for introducing air and combustible fuel therein, and means for igniting the combustible mixture, to initiate the burning thereof, said means comprising a sparking device, and means for cooling said sparking device after it has operated to ignite said combustible mixture, and during the combustion in said combustion chamber.

3. A power plant, comprising a combustion chamber of a kind in which there is a continuous combustion, comprising means for introducing air and combustible fuel therein, and means for igniting the combustible mixture, to initiate the burning thereof, said means comprising a sparking device, and means for cooling said sparking device after it has operated to ignite said combustible mixture, and during the combustion in said combustion chamber, said means comprising a duct for constantly leading a stream of air over said sparking device.

4. A power plant, comprising a combustion chamber of a kind in which there is a continuous combustion, comprising means for introducing air and combustible fuel therein, and means for igniting the combustible mixture, to initiate the burning thereoef, said means comprising a sparking device, and means for cooling said sparking device after it has operated to ignite said combustible mixture, and during the combustion in said combustion chamber, said means comprising a duct for constantly leading a stream of air over said sparking device, said sparking device being located out of reach of the flames in said combustion chamber.

5. A power plant, comprising a combustion chamber, two means for introducing both fuel and air into said combustion chamber, a sparking device for initiating combustion in said chamber, and means for stopping the flow of fuel through one of said means, its associated means for introducing air continuing to discharge, said sparking device being located in the path of said discharge, whereby it is cooled.

In witness whereof, I have hereunto signed my name.

ALPHONSE LA FON.